United States Patent [19]

Timmerman et al.

[11] 4,266,044

[45] May 5, 1981

[54] NOVEL POLYMERIC MORDANTING AGENTS FOR ANIONIC COMPOUNDS

[75] Inventors: Daniël M. Timmerman; Walter F. De Winter, both of Mortsel; Albert E. Van Hoof, Berchem, all of Belgium

[73] Assignee: AGFA-GEVAERT, N.V., Mortsel, Belgium

[21] Appl. No.: 968,175

[22] Filed: Dec. 11, 1978

Related U.S. Application Data

[62] Division of Ser. No. 213,990, Dec. 30, 1971, Pat. No. 4,145,220.

[30] Foreign Application Priority Data

Jan. 11, 1971 [GB] United Kingdom ................ 1288/71
Sep. 10, 1971 [GB] United Kingdom .............. 42381/71

[51] Int. Cl.[3] ..................... C08C 19/22; C08F 220/60; C08F 26/00; C08F 226/00

[52] U.S. Cl. .................................... 525/336; 525/327; 525/359; 525/376; 526/218; 526/287; 526/292; 526/304; 526/923

[58] Field of Search .................... 526/51, 23, 46, 923, 526/287, 304, 292; 525/336, 359, 376, 327

[56] References Cited

U.S. PATENT DOCUMENTS 2,945,006 7/1960 Minsk .................................. 526/51
3,706,563 12/1972 Ushiyama et al. ................. 96/84 A

*Primary Examiner*—Joseph L. Schofer
*Assistant Examiner*—Herbert J. Lilling
*Attorney, Agent, or Firm*—A. W. Breiner

[57] ABSTRACT

Mordanting agents for anionic organic compounds are described which comprise recurring units of the formula:

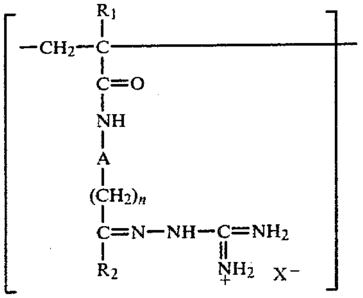

wherein $R_1$ is hydrogen or methyl; A is methylene or methylene substituted by $C_1$–$C_5$ alkyl;
n is 0 or 1;
$R_2$ is alkyl, and
X is an acid radical.

They are particularly suitable for hindering diffusion of dyes in hydrophilic colloid media e.g. hydrophilic colloid layers of a photographic silver halide element, for hindering diffusion of color couplers in such layers e.g. layers of a radiographic silver halide color element and for the formation of color images by the relief imbibition process.

5 Claims, 2 Drawing Figures

NOVEL POLYMERIC MORDANTING AGENTS FOR ANIONIC COMPOUNDS

Figure 1:
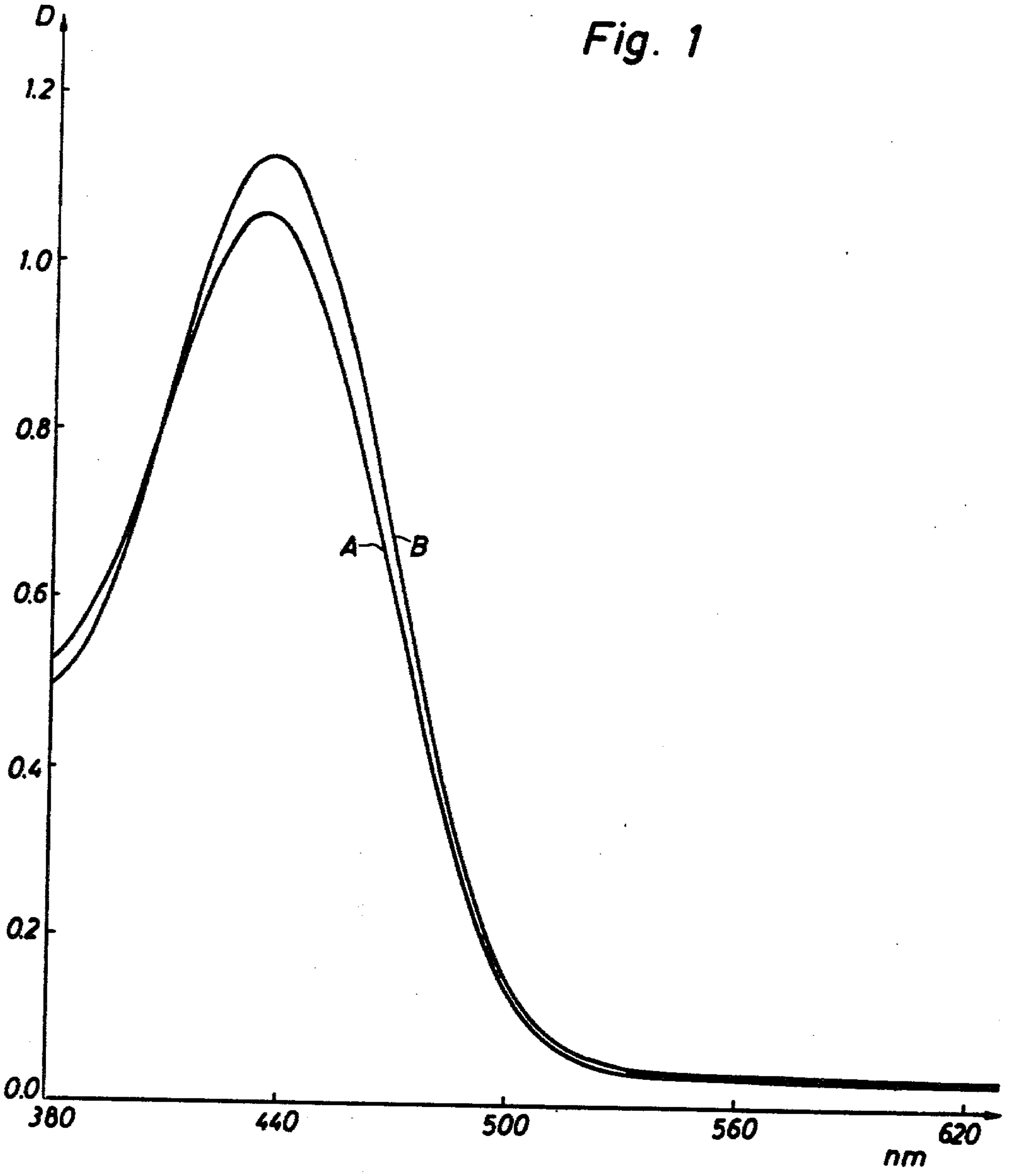

This is a division of application of Ser. No. 213,990 filed Dec. 30, 1971, now U.S. Pat. No. 4,145,220.

The present invention relates to polymeric mordanting agents for anionic organic compounds e.g. anionic dyes, to a process of fixing such anions in hydrophilic colloids, to colloid compositions incorporating polymeric compounds acting as mordants for anions, and to colloid compositions comprising anions mordanted by the said polymeric mordants.

Mordanting agents hindering diffusion or anionic compounds in colloid layers strongly reduce diffusion of said compounds in said layers. They are of great interest in relief imbibition printing according to which acid dyes are transferred from a tanned colloid relief to a colloid blank such as a gelatin-coated film or paper where they are absorbed and fixed. Further, they can be used in the preparation of light-screening layers e.g antihalation layers and filter layers for photographic light-sensitive silver halide elements, where it is essential that the soluble acid dyes used as light-screening dye are fixed so that they do not diffuse from the layers or coatings, in which they were incorporated, either during the manufacture of the photographic element or on keeping it or in photographically processing it. Colour couplers as used in silver halide colour photography and the dyestuffs formed by coupling of the said colour couplers during colour development, with the oxidized aromatic primary amino colour developing agent can also be made fast to diffusion in the photographic hydrophilic colloid layers by means of mordanting agents.

As mordanting agents for fixing anionic organic compounds in colloid layers several groups of polymers containing free amino groups, tertiary amino groups or quaternary ammonium groups have been proposed and applied more or less successfully.

In U.S. Pat. No. 2,882,156 of Louis M. Minsk, issued Apr. 14, 1959, condensation products of polyvinylalkylketones with aminoguanidine have been described for use as mordants for acid dyes. These polymeric mordants, however, are not satisfactory in all respects.

Especially disadvantageous is the relatively strong colour of the aqueous solutions of these mordants. This would be due to the instability of the polyvinyl alkylketones. As a matter of fact it is known from Houben-Weyl, Die Methoden der Organischen Chemie, fourth Edition, Volume XIV/1, Macromoleculare Stoffe, Part 1, p. 1090–1095, that the originally colourless polyvinyl alkyl ketones gradually turn coloured which is particularly promoted by light, heat and traces of acid.

It has now been found that polymeric compounds comprising recurring units of the following general formula I:

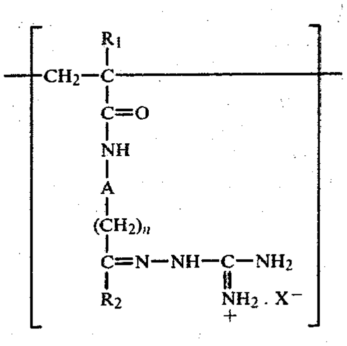

I.

wherein:

$R_1$ is hydrogen or methyl,

A is methylene including methylene substituted by $C_1$–$C_5$ alkyl such as methyl, dimethyl, ethyl, isopropyl and isobutyl, n is 0 or 1, $R_2$ is alkyl, e.g. methyl and ethyl, and X stands for an acid radical of an inorganic acid e.g. hydrochloric acid or an organic acid e.g. lactic acid, glycolic acid, alkane sulphonic acids of from 1 to 4 carbon atoms e.g. methane sulphonic acid or the acid radical of a saturated monobasic aliphatic carboxylic acid containing from 2 to 4 carbon atoms e.g. acetic acid, propionic acid or butyric acid, have an effective mordanting action in respect of anionic compounds e.g. acid dyes.

The polymeric mordanting agents according to the present invention are keto-imino guanidinium salts and compatible in varying amounts with hydrophilic colloidal materials such as gelatin and form with anionic compounds substantially water-insoluble derivatives so that said dyes remain immobile in the said hydrophilic colloidal materials and do not wander or diffuse from their original site through the said hydrophilic colloidal materials.

According to a first method, the polymeric mordants according to the present invention can be prepared by the condensation of aminoguanidine or salts thereof with polymers and co-polymers of N-alkyl substituted (meth) acrylamides containing a ketogroup in the N-substituent i.e. N-oxo-alkyl(meth)acrylamides.

The polymeric compounds for being condensed with aminoguanidine or salts thereof may comprise in addition to the keto group containing recurring units of the following formula II:

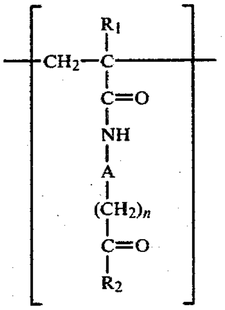

II.

wherein: $R_1$, $R_2$, A and n have the same significance as above, up to about 70% by weight of units of other copolymerised monomers for example (meth)acrylamide units, N-alkyl(meth)acrylamide units, alkyl(meth-)acrylate units, styrene units, acrylonitrile units, N-vinylpyrrolidone units, etc.

The monomeric N-oxoalkyl(meth)acrylamides from which the polymeric compounds with recurring units of the above formula II are formed are known for example from J. Org. Chem., Vol. 32, 1967, p. 440-443 and United Kingdom patent specification No. 1,045,869 filed Nov. 4, 1964 by Lubrizol Corp. and can be prepared as described therein.

In the condensation of the aminoguanidine or salt thereof with polymers and copolymers having keto-group containing recurring units of the above formula II the aminoguanidine or salt thereof is generally used in amounts slightly exceeding the stoichiometric amounts necessary to convert the ketogroups into ketoiminoguanidine groups. Larger amounts may also be used but it was observed that even when using a large excess of amino-guanidine or salt thereof the condensation reaction does not proceed quantitatively so that the polymeric mordanting compound formed comprises besides recurring units of the above formula I, unreacted structural units of the above formula II.

According to an alternative method for preparing the polymeric mordants of the invention, the monomeric N-oxoalkyl(meth)acrylamides are first condensed with aminoguanidine or a salt thereof whereupon the resulting monomeric guanyl hydrazone derivative formed is polymerised or copolymerised with other comonomers of the type described above.

According to the latter method it is possible to prepare polymeric mordanting agents comprising exclusively or the exactly desired amount of recurring units of the above general structure I.

Moreover, according to this method the polymeric mordants can be prepared by a general one step synthesis wherein polymerization takes place in the reaction medium of the aminoguanidine or salt thereof and the monomeric N-oxoalkyl (meth)acrylamide, optionally in the presence of one or more other copolymerizable monomers. When polymerization takes place in the presence of copolymerizable monomers the said monomers are preferably used in amounts such that in the resulting polymeric mordanting agents the units of copolymerized monomers do not account for more than about 70% by weight.

In the following preparations some examples are given of polymeric compounds which were found particularly suitable for condensation with aminoguanidine to form mordants according to the invention.

PREPARATION 1

Poly(diacetone acrylamide)

A 5 liter reaction vessel is provided with a stirring device, a reflux condenser, and a cooling spiral. Cold water is automatically supplied to the cooling spiral when activated by means of a relay which is controlled by a thermometer contained in the cooling spiral.

In this reaction vessel, 500 g of N-diacetoneacrylamide and 5 g of azobisisobutyronitrile are dissolved in benzene free from thiophene and water. The solution formed is heated to 80° C. and kept at this temperature for 22 hours. The polymerization reaction is slightly exothermic and therefore controlled by means of the cooling spiral. After the polymerization the reaction mixture is cooled and diluted with 500 ml of n-hexane whereupon the poly(diacetone acrylamide) is isolated by pouring into 12 l of n-hexane.

After washing with 3 l of n-hexane and drying under vacuum till constant weight 500 g of product are obtained.

PREPARATION 2 co(diacetone acrylamide/acrylamide)

In a 1000 ml reaction vessel provided with reflux condenser, stirrer and thermometer 30.0 g of diacetone acrylamide and 70 g of acrylamide are dissolved together with 0.5 g of azo-bisisobutyronitrile in methanol. The solution is diluted with methanol to make 500 ml.

With stirring, the solution is heated to the reflux temperature. The polymerization reaction is slightly exothermic and after 25 minutes the co(diacetone acrylamide/acrylamide) begins to precipitate gradually.

The total reaction time is 7 h 15 min. whereupon, after cooling to room temperature, the copolymer is filtered off. The product is washed first with 100 ml of methanol and then with 100 ml of acetone. It is dried under vacuum at 35° C. till constant weight.

Yield: 92 g.

By analysis it was found that the copolymer comprised by weight 52.86-52.93% of carbon, 7.67-7.68% of hydrogen and 16.2-16.47% of nitrogen from which there can be calculated that the copolymer comprises 26.3% by weight of diacetone acrylamide units and 73.7% by weight of acrylamide units.

PREPARATIONS 3-7

In an analogous way as described in preparation 2, the following copolymers were prepared:

3. co(diacetone acrylamide/acrylamide) (49.6/50.4% by weight)
4. co(diacetone acrylamide/N-t-butylacrylamide) (55.8/44.2% by weight)
5. co(diacetone acrylamide/methylacrylate) (49.5/50.5% by weight)
6. co(diacetone acrylamide/methylacrylate) (68/32% by weight)
7. co(diacetone acrylamide/acrylonitrile) (52.4/47.6% by weight).

In the following table the reaction conditions are listed for the preparation of the above copolymers.

TABLE

| Co-poly mer | g diace-tone acryl-amide | g como-nomer | g azo-bis-iso-butyro-nitrile | reac-tion time (h) | tempe-rature | Solvent | Yield |
|---|---|---|---|---|---|---|---|
| 3 | 50 g | 50 g | 0.5 g | 18 | reflux | methanol to make 500 ml | 100 g |
| 4 | 50 g | 50 g | 0.5 g | 17 | reflux | methanol to make 500 ml | 89.2 g |
| 5 | 50 g | 50 g | 0.5 g | 17 | reflux | acetone to make 500 ml | 96.6 g |
| 6 | 70 g | 30 g | 0.5 g | 17 | reflux | acetone to make 500 ml | 97.0 g |
| 7 | 50 g | 50 g | 1.0 g | 22 | reflux | methaol to make 400 ml | 91.9 g |

The following preparations illustrate how mordants according to the invention can be prepared by condensation of aminoguanidine with the polymeric compounds of preparations 1 to 7 above.

PREPARATION 8

Condensation of the polymer of preparation 1 with aminoguanidium bicarbonate

In a 3 liter reaction vessel provided with stirrer, reflux condenser and thermometer, 169 g of polymer of preparation 1 are dissolved at room temperature in 1000 ml of dimethylformamide (DMF). 200 ml of acetic acid are added whereupon the mixture is heated to 50° C. and aminoguanidinium bicarbonate is added portionwise. After 30 minutes, 143 g of aminoguanidinium bicarbonate have been added while carbon dioxide escapes from the reaction medium.

After 5 hours of reaction at 50° C. the solution is diluted with water to make 20 liters. With stirring, a solution of 200 g of sodium hydroxide in 2 liters of water is added and the reaction product precipitates under the form of the free base which is filtered off and washed with water till neutral. The product is admixed with water and 60 ml of acetic acid is added in order to convert the poly(diacetone acrylamide guanyl hydrazone) into the water-soluble ammonium acetate. The solution is then diluted with water to make 2 liters. The solution obtained comprised per 100 ml, 7.67 g of polymeric compound.

Analysis

By analysis of a sample of the solution, which was freeze-dried, it was found that 1 g of polymer contained 2.18 milliequivalents of ketoiminoguanidinium acetate (titration in acetic acid with $HClO_4/HAc$) and that the polymer contained by weight 19.1% of nitrogen, 57.05% of carbon and 8.9% of hydrogen.

From these results the following composition can be given for the polymer obtained:

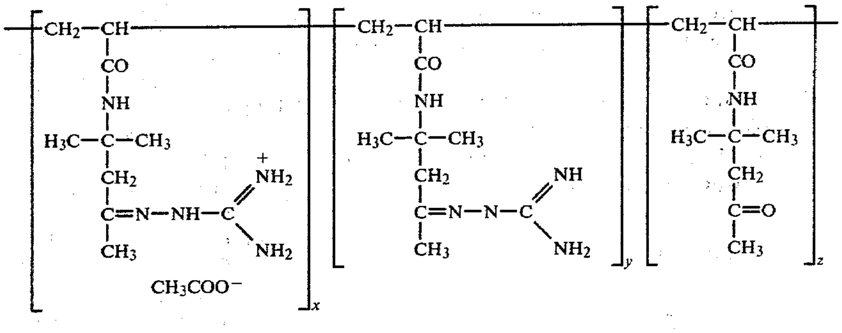

wherein:

x=15.0 mole % y=29.4 mole % and z=55.6 mole %.

The product thus comprises 55.6 mole % of unreacted diacetone acrylamide units and 44.4 mole % of gunayl hydrazone units.

PREPARATIONS 9-14

The condensations of aminoguanidinium bicarbonate with the copolymers of preparations 2-7 were carried out in a similar way as described in preparation 8. The reaction time was 5 hours and the reaction temperature 50° C.

The reaction conditions and results attained are listed in the following table.

TABLE

| | | | | | Composition of isolated copolymer | |
|---|---|---|---|---|---|---|
| Preparation | g copolymer of preparation | solvent(s) | g acetic acid | g aminoguanidinium bicarbonate | m.eq. of ketoiminoguandine acetate per g copolymer | % unreacted diacetone acrylamide units |
| 9 | 93 g/prep. 2 | 350 ml of DMF + 250 ml of water | 35 g | 23.65 g | 0.94 | 25.2 |
| 10 | 96 g/prep. 3 | 560 ml of DMF +40 ml of water | 60 g | 40.56 g | 1.58 | 31.1 |
| 11 | 88 g/prep. 4 | 500 ml of DMF | 84 g | 36.20 g | 0.83 | 34.7 |
| 12 | 90.5 g/prep. 5 | 600 ml of DMF + 50 ml of water | 106 g | 38.23 g | 2.12 | 1.5 |
| 13 | 90.4 g/prep. 6 | 600 ml of DMF | 128 g | 54.46 g | 2.16 | 14.3 |
| 14 | 90.4 g/prep. 7 | 500 ml of DMF + 50 ml of water | 106 g | 36.82 g | 1.6 | 15.9 |

Before use as mordants, the pH of the solutions obtained is adjusted to pH 4 by means of acetic acid.

In preparation 15 it is illustrated how the monomeric N-oxoalkyl(meth)acrylamides are condensed with aminoguanidine.

PREPARATION 15

Condensation of diacetone acrylamide with aminoguanidinium bicarbonate.

In a 1 liter reaction vessel fitted with stirrer, reflux condenser, dropping funnel and thermometer 84.5 g (0.5 mole) of N-diacetone acrylamide and 68 g (0.5 mole) of aminoguanidinium bicarbonate are mixed at room temperature in 300 ml of ethanol.

The dispersion formed, after addition of 0.14 g of hydroquinone monomethyl ether as polymerization inhibitor, is heated to 70° C. whereupon 37.5 g (0.625 mole) of acetic acid are added dropwise. After having been heated for 65 minutes at 70° C. a clear solution is obtained. In order to complete the condensation reaction, heating of the solution is continued for 90 min. at 70° C.

The solution is diluted with ethanol to make 500 ml and cooled to room temperature. It is poured with stirring into 4.5 liters of n-hexane and the monomeric compound corresponding to the formula:

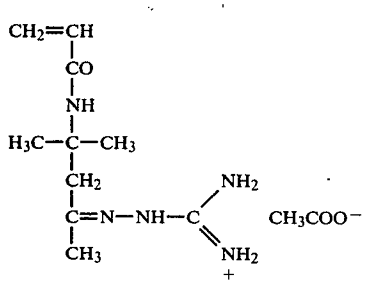

separates in the form of a colourless oil. The supernatant liquid is decanted and the oil is washed with 0.5 liter of n-hexane. The oil is dried under reduced pressure at room temperature till constant weight.

Yield: 143 g.

By thin layer chromatography it is found that the ketone groups are converted quantitatively into hydrazone groups.

The alternative method of preparing the mordants of the invention is illustrated by the following preparations.

PREPARATION 16

Homopolymerization of the isolated monomeric guanyl hydrazone derivative of preparation 15.

In a 250 ml reaction vessel fitted with stirrer, reflux condenser, thermometer and nitrogen inlet tube, a solution of 71.25 g (0.25 mole) of the above monomer in ethanol is diluted to make 125 ml. 0.41 g of azo-bis-isobutyronitrile is added as polymerization initiator and the mixture is stirred to obtain a homogeneous solution.

The solution is heated, while introducing nitrogen, for 24 hours at 70° C. A clear very viscous solution is formed from which the homopolymer is isolated in the following way: the viscous solution is diluted with 125 ml of ethanol whereupon the solution is poured in a solution of 70 g of sodium hydroxide in 3.3 liters of water.

The polymer that precipitates is washed three times with 0.5 liter of demineralized water in order to remove the sodium acetate formed and the excess of sodium hydroxide.

The polymer is dissolved again in water by acidifying with 25 ml of acetic acid whereupon the solution is diluted to make 362 g of solution.

By elementary N-analysis and titration of the solution with perchloric acid in acetic acid medium it was calculated that this solution comprises 15.4% by weight of homopolymer and 0.33% by weight of sodium acetate.

PREPARATION 17

Homopolymerization of the non-isolated monomeric guanly hydrazone derivative according to preparation 15.

In a 10 liter reaction vessel fitted with stirrer, reflux condenser, dropping funnel, thermometer and nitrogen inlet tube, 1690 g (10 mole) of N-diacetone acrylamide, 1360 g (10 mole) of aminoguanidinium bicarbonate and 4.32 liters of ethanol are heated to 70° C.

720 g (12 mole) of acetic acid are added dropwise in 1 hour and the originally white dispersion gradually obtains a clear appearance. After having heated for 80 minutes at 70° C. a slightly yellow coloured clear solution is obtained which is further heated for 1 hour at 70° C. while stirring and introducing nitrogen.

To the solution of the monomer formed, 8.2 g of azo-bis-isobutyronitrile is added and homopolymerization starts.

The reaction is slightly exothermic and in the first hours the temperature raises to maximum 75° C. After 3 hours, the viscosity of the clear solution has increased considerably and another 8.2 g of azo-bis-isobutyronitrile are added.

After having heated the mixture for 24 hours at 70° C. a very viscous clear solution of the homopolymer is obtained; this solution is then diluted with water to make 10 liters.

This solution comprises per 100 ml, 28.5 mg of homopolymer.

Thin layer chromatography showed that the solution comprised neither diacetone acrylamide nor aminoguanidinium acetate.

A 5% by weight aqueous solution of the homopolymer formed has an absolute viscosity of 10.8 cps. The intrinsic viscosity [$\eta$] of the polymer measured in N/10 sodium chloride at 25° C. is 0.39 dl/g.

PREPARATION 18

Polymerization of the non-quantitative condensation product of aminoguanidinium bicarbonate and N-diacetone acrylamide.

In a 250 ml reaction vessel fitted with stirrer, reflux condenser, thermometer and dropping funnel, 33.8 g (0.20 mole) of N-diacetone acrylamide and 13.6 g (0.10 mole) of aminoguanidinium bicarbonate are mixed with ethanol to obtain 93 ml.

The dispersion is heated to 70° C. and acidified gradually with 7.2 g (0.12 mole) of acetic acid. After having been heated for 40 minutes at 70° C. a clear solution is obtained.

The 2 molar solution of monomer, after having been heated for 2 hours at 70° C., is polymerized at 70° C. by addition of 0.324 g of azo-bis-isobutyronitrile as polymerization initiator.

A stream of nitrogen is introduced in the reaction medium while keeping the medium with stirring at 70° C.

After a total polymerization time of 24 hours the monomeric solution is converted into a clear highly viscous solution. The solution is diluted with water to make 1600 ml whereupon it is poured with stirring into a solution of 236 g of sodium hydroxide in 10 liters of water.

The polymeric precipitate, after decanting the supernatant liquid, is washed twice with 1 liter of water. The precipitate is dissolved in a mixture of 9.8 g of acetic acid and water. Yield: 200 ml of an aqueous solution comprising 19.7 g of polymer per 100 ml of solution. The polymer obtained comprises 50 mole % of recurring units of the following formula A and 50 mole % of recurring units of the following formula B.

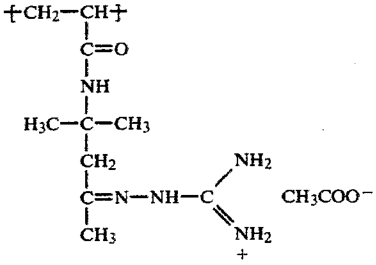
A.

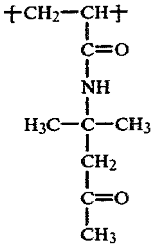
B.

PREPARATION 19

The copolymer comprising 90 mole % recurring units of the formula A of preparation 18 and 10 mole % recurring units of formula B of preparation 18, was prepared in a similar way as the copolymer of preparation 18. For this purpose the following amounts of ingredients were used:

33.8 g of N-diacetone acrylamide
24.48 g of aminoguanidinium bicarbonate
12.96 g of acetic acid
ethanol till a volume of 100 ml.

Yield: 200 ml of a solution comprising per 100 ml 23.1 g of polymeric product.

The invention in its broadest aspect comprises hindering diffusion of an anionic organic compound in a hydrophilic colloid medium by means of a polymeric mordanting agent having recurring units of the above formula I. The hydrophilic colloids include natural and synthetic hydrophilic colloids or mixtures of colloids e.g. gelatin, casein, polyvinyl alcohol, poly-N-vinyl pyrrolidone, carboxymethylcellulose, sodium alginate, etc.

The modanting polymers comprising structural units as defined above are of particulate advantage for fixing anionic light-screening dyes in a colloid layer of a photographic silver halide element. Light-screening dyes may be used as filter dye in a layer coated over one or more light-sensitive emulsion layers or between two emulsion layers e.g. differently colour-sensitized emulsion layers to protect the underlying light-sensitive emulsion layer(s) from the action of light of wavelength absorbed by such light screening dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

The polymeric mordanting agents containing structural units of the above formula I when applied for fixing light-screening dyes in a hydrophilic colloid layer of a photographic silver halide element may be used in widely varying amounts. They are generally used in amounts comprised between 0.1 g and 10 g per sq.m. The polymeric mordants are highly resistant to lateral diffusion and do not cause fogging in the silver halide emulsion layers. Moreover, they do impair the light-screening dyes of being readily rendered ineffective i.e. decolourized or destroyed by one of the baths usually employed in processing the photographic elements after exposure.

The mordants of the invention cannot only be used for substantially increasing the resistance to diffusion in hydrophilic colloid compositions of light-screening dyes but also for increasing the diffusion-resistance in hydrophilic colloids of most divergent kinds of organic substances containing one or more anionic groups such as antistatic agents, wetting agents, optical bleaching agents, colour couplers, mask-forming compounds, coloured colour couplers, U.V.-absorbers, etc. For instance the polymers according to the present invention make it possible to use anionic colour couplers of the non-diffusion resistant type in a multilayer silver halide colour material, and improve the diffusion-resistance of anionic colour couplers made already diffusion-resistant to a certain level by a ballasting group. When used to mordant colour couplers in the emulsion layers of a photographic colour material an important increase in image-sharpness is obtained.

The polymeric mordanting agents of the present invention are particularly suitable for use in radiographic silver halide colour elements comprising colour forming coupling compounds which upon development couple with the oxidized aromatic primary amino developing agent to form a dye image.

In Gevaert-Agfa's German Patent Application No. P 1946652.5 provisionally published Mar. 25, 1971 a method is described and claimed according to which monochromic radiographic images are produced, optionally together with a silver image, thus offering more visual retrieval of information than corresponding black-and-white radiographic images.

The radiographic emulsion layers of these colour elements comprise colour forming coupling compounds which couple with the oxidized aromatic primary amino colour developing agent to form a dye image.

Though the colour couplers used in the radiographic silver halide emulsions are provided in their molecule with a ballasting group in order to render them fast to diffusion in the emulsion it was observed that the developing solution became dyed after being used for some time owing to either diffusion of the dye, formed by colour development, from the emulsion into the developing solution or diffusion of the colour coupler from the emulsion into the developing solution where through serial oxidation it couples with the oxidized aromatic primary amino colour developing agent.

The polymeric mordants comprising recurring units of the above general formula I were found to effectively prevent diffusion of these anionic compounds without having a deleterious effect on the radiographic colour image formation. Moreover, they do not cause fogging of the emulsion and to not increase the viscosity of the gelatin coating compositions like most mordanting agents comprising quaternary ammonium groups. In addition thereto they are fully compatible in varying amounts with hydrophilic colloids such as gelatin in acid as well as neutral medium. Moreover, they are fully insoluble in alkaline medium of pH above 9 and thus are not washed out of the element during colour developing so that the developer does not become contaminated with mordanting agent.

The polymeric mordants when used in radiographic colour elements are preferably incorporated in a protective hydrophilic colloid layer e.g. a gelatin antistress layer, which is coated over the silver halide emulsion layer comprising the colour forming coupler, where the mordants also show a slight antistatic effect. When added directly to the silver halide emulsion from an aqueous solution difficulties are encountered in that a sticky precipitate is formed probably by reaction of the mordanting agent with the colour coupler. Therefore when it is desired to incorporate the polymeric mordanting agent in the silver halide emulsion itself special techniques should be applied in order to obtain a homogeneous distribution of the polymeric mordant e.g. a homogeneous dispersion of the polymeric mordant and the colour coupler is first prepared, using for instance the oil-former technique, which is then added to the silver halide emulsion.

The polymeric mordants may be used in radiographic colour elements in widely varying amounts which are dependent on the particular modant involved; they are generally used in amounts comprised between 5 mg and 2 g per sq.m.

The radiographic colour-developable silver halide element into which the above mordanting agents are used to prevent diffusion of anionic colour couplers and/or dyestuffs formed therewith by reaction with an oxidized aromatic primary amino colour developing agent are preferably of the type described in German Patent Application No. P 1946652.5 mentioned above and therefore this application should be read in conjunction herewith.

The said element preferably comprises a colourless support and at least one silver halide emulsion layer, each such layer containing at least one colour coupler producing by coupling with an oxidized aromatic primary amino developing agent a monochromic dye image mainly absorbing in the red and green spectral regions.

The monochromic dye image preferably has its main absorption in the red region of the visible spectrum and absorbs in the green region of the visible spectrum for at least 30% in respect of the red region. In other words cyan dye images with a fairly large side-absorption in the green region and blue dye images are favoured.

For this purpose it is preferred to use colour couplers of the phenol or α-naphthol type that on colour development of the exposed silver halide with an aromatic primary amino developing agent form a quinoneimine dye mainly absorbing in the red and green and having an absorption maximum in the spectral wavelength range of 570 to 660 nm.

Examples of phenol type odour couplers having such properties can be found in U.S. Pat. Nos. 2,772,162, of Ilmari F. Salminen and Charles R. Barr, issued Nov. 27, 1956 and 3,222,176 of Jan Jaeken, issued Dec. 7, 1965 and in United Kingdom patent specification No. 975,773 filed Sept. 4, 1961 by Gevaert Photo-Producten N.V.

The radiographic silver halide emulsions may comprise different types of silver halide e.g. silver chloride, silver bromide, silver chlorobromide, silver bromoiodide, and silver chlorobromoiodide. Iodide containing bromide emulsions, preferably containing less than 10 mole % of iodide, are especially useful for directly or indirectly recording penetrating radiation in the form of a monochromic image.

In order to obtain radiographic silver halide materials that are suited for colour development and that have a photosensitivity of practically the same value as commercial black-and-white radiographic material suited for exposure with the aid of fluorescent tungstate screens, have per sq.m an amount of silver halide (preferably silver bromoiodide containing from 2 to 10 mole % of iodide) corresponding to 5 to 16 g, preferably 6 to 12 g, of silver nitrate.

The colloid binder for the silver halide preferably essentially consists of gelatin and is preferably present in an amount of 3 to 7 g per sq.m. in a single silver halide emulsion layer.

The radiographic colour elements preferably comprise on both sides of a transparent support e.g. a transparent resin support, a silver halide emulsion layer comprising a colour coupler for producing a monochromic dye image and a protective hydrophilic colloid layer coated thereover.

The protective hydrophilic colloid layer into which the mordanting agents are preferably incorporated is preferably a gelatin antistress layer which may comprise in addition to the mordanting agent, all kinds of ingredients commonly employed in gelatin antistress layers or radiographic silver halide elements used for direct or indirect recording of penetrating radiation e.g. coating aids, antistatic agents, antifoggants, wetting agents, etc.

The silver halide emulsion layer also comprises all kinds of ingredients characteristic for radiographic silver halide emulsions used in the direct or indirect recording of penetrating radiation. More details about these ingredients can be found in German Patent Application No. P 1946652.5 mentioned above.

The mordanting agents of the invention are further especially useful in the formation of mono- or multicolour images of improved quality by the relief imbibition process.

In the manufacture of colour films according to the imbibition process, a first step comprises the formation of a relief image suited for absorbing a dye solution. The relief image is commonly prepared in a photographic way, e.g. by hardening development of a gelatino silver halide emulsion layer and selective removal of the non-hardened portions.

The whole is referred to as a matrix or matrix film. The matrix containing the relief image after being immersed into a solution of a dye is brought into close contact with a colloid layer of a receptor material. The receptor material applied for cinematographic purposes contains a transparent film support, at least one colloid layer for absorbing the dye(s) and occasionally a light-sensitive silver halide emulsion layer. Such material is known as the blank or blank film.

During the contact of the dyed matrix with the blank film, dye absorbed in the relief image of the matrix diffuses into the colloid layer of the blank film, on which in this way a monochrome image is formed. In repeating the dye transfer step by using each time a novel blank film, several prints are made with one single matrix. Multicolour images can be obtained by preparing relief images which correspond with the colour separation images to be produced in register. Thus, monochrome separation images can be printed in register forming on one blank a multicolour image. This process of producing multicolour images by imbibition is described, e.g. by P. Glafkides, Photographic Chemistry, Fountain Press, London (1960), Vol. II, p. 696-699.

Acid dyes suited for the imbibition printing process that can be mordanted by means of the polymers and copolymers the structural units of which are given above, are for example:

Anthracene yellow GR
Fast Red S Conc.—C.I. Acid Red 88—C.I. 15,620
Pontacyl Green SN Ex.—C.I. 44,090
Acid blue black—C.I. 20,470
Acid Magenta O—C.I. Acid Violet 19—C.I. 42,685
Naphthol Green B Conc.—C.I. Acid Green 1—C.I. 10,020
Brillant Paper Yellow Ex. Conc.—C.I. Direct Yellow 4—C.I. 24,890
Tartrazine—C.I. Acid Yellow 23—C.I. 19,140
Metanil Yellow Conc.—C.I. Acid Yellow 36—C.I. 13,065
Pontacyl Scarlet R. Conc.—C.I. Acid Red 89—C.I. 23,910
Pontacyl Rubine R Extra Conc.—C.I. Acid Red 14—C.I. 14,720

Suitable supports for the matrix film and the blank film are composed of modified cellulose products such as cellulose esters, e.g. cellulose triacetate, cellulose acetobutyrate, cellulose propionate or synehtic resins such polycondensation products of the polyester type, e.g. polyethylene terephthalate, polysulphonates and polycarbonates.

Colloids for preparing the receptor layer of blank films containing a silver halide emulsion layer are usually of the same type as those known to one skilled in the art of preparing photographic silver halide materials. Normally the colloid layer contains gelatin and/or polyvinyl alcohol which colloids may be mixed with coating aids such as wetting agents, polymer latices, viscosity reducers, antistatic agents, or softening agents improving the flexibility and also when necessary to some extent hardening agents improving the mechanical strength. When used in the production of sound film the colloid layer acting as receptor layer in the blank film is usually applied onto a silver halide emulsion layer.

The mordanting polymers containing structural units as described above when applied in a blank film are preferably used in an amount of 15 to 35 g per 100 g of hydrophilic colloid.

Owing to their high-resistance to diffusion the mordants of the invention are very useful for imbibition printing. The sharpness of the transferred dye image is excellent and no contamination of the matrix occurs. When mordants would be used that are insufficiently resistant to diffusion, some of it would pass from the blank upon the matrix. On re-immersing the matrix in the dye solution, the dye would precipitate also on non-image areas and on subsequent printing a more or less uniform colour fog would result on the blank film. This harmful colour-fog formation would be repeated and evidently increased during the production of further prints.

In imbibition printing the mordants of the invention also effect a sufficient colour absorption. By colour absorption is meant the maximum colour density obtainable in any given combination of time and temperature under which the dye-immersed matrix is brought into close contact with the blank. Said conditions are determined by the apparatus ensuring the contact between the matrix and the blank film.

If, in imbibition printing, the colloidal blank, has been mordanted according to the present invention, lateral diffusion of the transferred anionic dye is completely inhibited and so a very sharp print is obtained.

Figure 2:
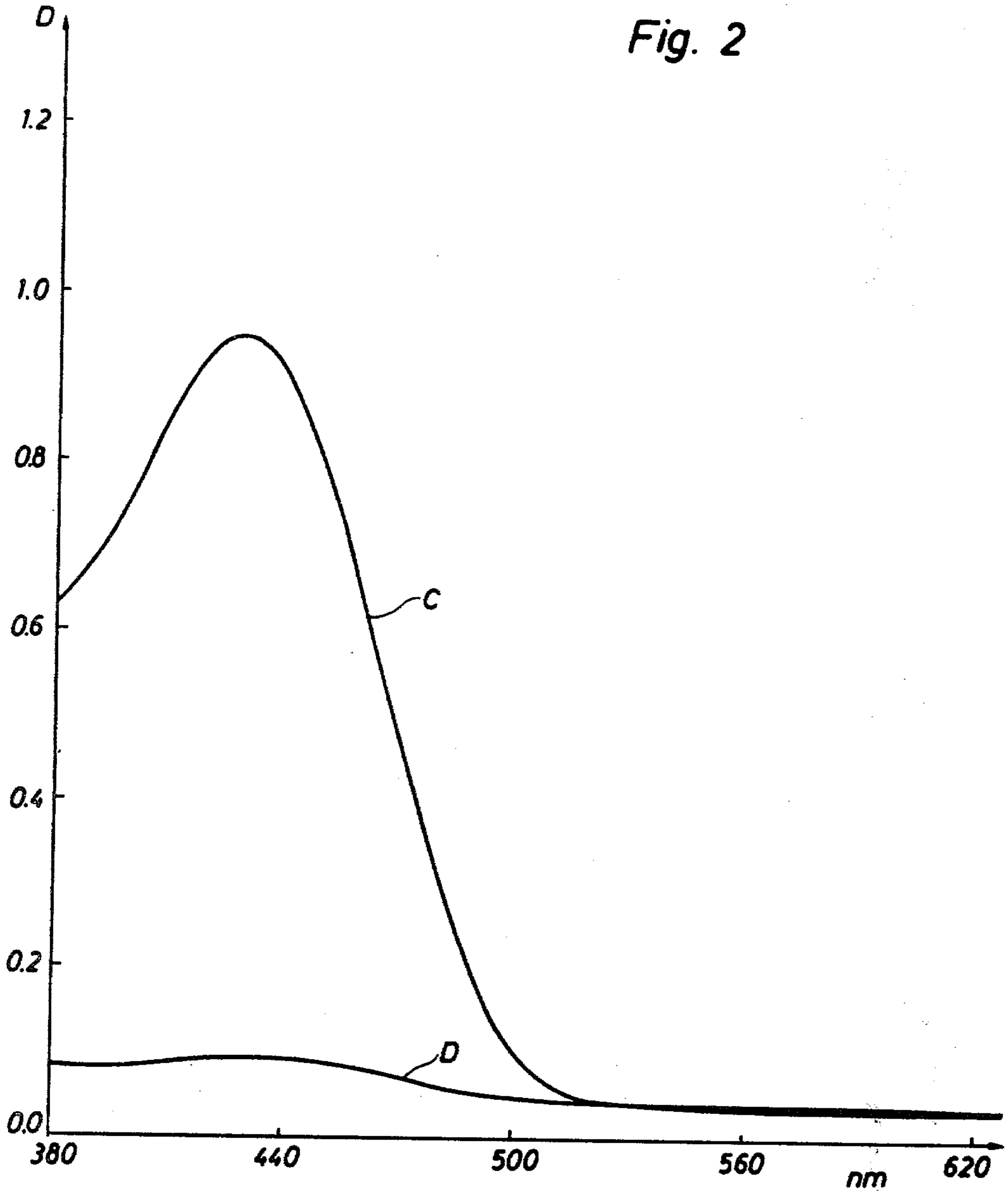

The drawing consists of FIGS. 1 and 2 showing spectral absorption curves for antihalation layers as will be discussed in more detail in Example 1.

The following examples illustrate the use of the mordants of the present invention.

EXAMPLE 1

A subbed cellulose triacetate support was provided first with a gelatin layer comprising the mordanting agent of preparation 8 and then with a gelatin layer comprising as antihalation dye the dyestuff having the formula:

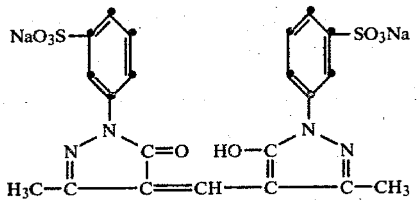

The first gelatin coating composition, which has a pH of 4.5, was applied in such a way that per sq.m 5 g of gelatin and 1000 mg of mordanting agent were present and the second gelatin coating composition, which has a pH of 5.5, was applied in such a way that per sq.m 5 g of gelatin and 300 mg of dyestuff were present.

After conventional black-and-white processing and colour processing of the material thus formed, the dye was completely discoloured in the gelatin layer.

In order to examine the fastness to diffusion of the dyestuff, obtained by the presence of the mordanting agent, the material was subjected to the following test.

In a moist atmosphere of 100% relative humidity and at room temperature, a glass plate provided with a colourless thick gelatin layer (100 times as thick as the coloured gelatin antihalation layer) was kept in contact with the above material in such a way that the antihalation layer faces the thick gelatin layer. After two hours the materials were separated.

The spectral absorption curves (density versus wavelength) of the antihalation layers before (curve A) and after (curve B) this treatment are represented in FIG. 1 of the accompanying drawings. From these curves it is clearly apparent that the dyestuff is completely fast to diffusion.

When repeating the above test with a material in which no gelatin layer comprising a mordanting agent was provided underneath the coloured gelatin antihalation layer it was found that the dyestuff was fully diffusible. This is clearly apparent from the spectral absorption curves of the antihalation layer before (curve C) and after (curve D) the above treatment as represented in FIG. 2 of the accompanying drawings.

EXAMPLE 2

Onto a subbed cellulose triacetate support a gelatin composition was applied which contained in parts by weight the following ingredients:

| | |
|---|---|
| gelatin | 80 |
| water | 740 |
| 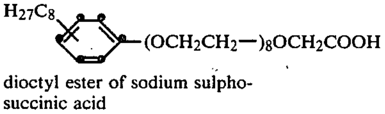 | 0.3 |
| dioctyl ester of sodium sulpho-succinic acid | 0.1 |

The composition was coated pro rate of 6 g of gelatin per sq.m.

Onto the gelatin layer a colloid layer containing a mordanting agent was applied from a solution containing the following ingredients:

| | |
|---|---|
| 73% aqueous gelatin solution | 700 ml |
| aqueous solution of preparation 8 comprising per 100 ml 7.67 g of polymeric mordanting agent | 133 ml |
| 40% aqueous formaldehyde solution | 1.5 ml |
| 2% aqueous solution of ADJUPAL A (a wetting agent containing isononyl-phenoxy-poly(ethylenoxy)ethanol sold by Adjubel N.V., Belgium) | 20 ml |

The coating of this solution was carried out in such a way that said colloid layer contained per sq.m 4 g of gelatin, 0.85 g of polymeric mordanting agent, 0.05 g of formaldehyde and 0.03 g of wetting agent.

The thus obtained blank film was used in hydrotype printing and very sharp high density colour prints were obtained therewith.

EXAMPLE 3

Example 2 was repeated with the difference that the mordanting agent of preparation 8 was replaced by the mordanting agent of preparation 12. The mordanting agent was used in such an amount that 0.85 g of mordanting agent was present per sq.m.

The blank film obtained was used in hydrotype printing and sharp colour prints were obtained. The maximum density of the colour prints was slightly less than that of the prints obtained according to example 2.

EXAMPLE 4

Example 2 was repeated, with the difference that the mordanting agent of preparation 8 was replaced by the mordanting agent of preparation 13. The mordanting agent was used in such an amount that 0.85 g of mordanting agent was present per sq.m.

The blank film obtained was used in hydrotype printing and sharp colour prints were obtained. The maximum density of the colour prints was even higher than that of the prints obtained according to example 2.

EXAMPLE 5

202 g of a high-speed gelatino silver bromoiodide (5 mole % of iodide) emulsion comprising an amount of silver halide equivalent to 25.9 g of silver nitrate and 25.9 g of gelatin, was heated for 1 hour at 38° C. whereupon were added: a solution of 13 g of the colour coupler with formula:

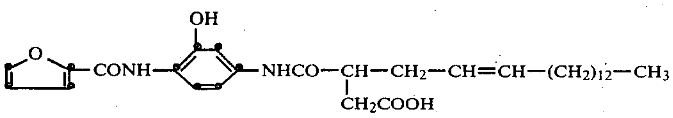

in 130 ml of 2 N sodium hydroxide, acetic acid in the amount necessary to neutralize the foregoing alkaline solution, 5-methyl-7-hydroxy-s-triazolo[1,5-a]pyrimidine as emulsion stabilizer, a wetting agent and a hardener.

The emulsion was digested for 3 hours and coated on both sides of a polyethylene terephthalate support having a total surface of 2×8.1 sq.m.

At both sides of the support the emulsions were overcoated with a gelatin antistress layer from a composition which was prepared as follows:

15 g of gelatin were melted in 250 ml of distilled water whereupon were added with stirring: 20 ml of a 10% aqueous solution of the homopolymer of preparation 17, a hardener, a coating aid and 15 ml of ethanol. The solution was diluted to make 400 ml and the pH was adjusted to 5.2.

The above gelatin antistress solution was coated on the emulsion layer pro rata of 1.5 g of gelatin per sq.m.

The photographic material formed was dried and, after exposure, developed for 24 sec. at 38° C. in 200 ml of a colour developing composition comprising an aromatic primary amino colour developing agent.

When 600 sq.cm of the radiographic colour element were developed the colour developing solution still has its original slightly yellow colour.

When in the formation of the antistress coating composition 20 ml of water was added to the melted gelatin instead of the 20 ml of the aqueous solution of mordanting agent, a radiographic colour element was formed which when developed as described above strongly dyed the developing solution which became blue-coloured.

We claim:

1. A polymeric mordanting agent comprising recurring units of the general structure:

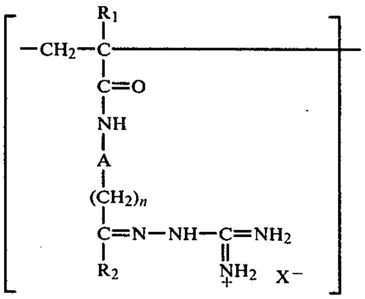

wherein:

$R_1$ stands for hydrogen or methyl,

A stands for methylene or methylene substituted by $C_1$-$C_5$ alkyl, n stands for 0 or 1, $R_2$ stands for alkyl, and X stands for an acid radical.

2. A polymeric mordanting agent according to claim 1, wherein the said agent is a copolymer comprising in addition to the said recurring units, recurring units selected from the group consisting of (meth) acrylamide units, N-alkyl (meth)acrylamide units, alkyl(meth)acrylate units, styrene units, acrylonitrile units, and N-vinylpyrrolidone units.

3. A polymeric mordanting agent according to claim 1, wherein A is dimethyl methylene and n is 1.

4. Method of preparing a polymeric compound comprising recurring units of the general structure of claim 1, which comprises condensing the corresponding monomeric N-alkyl substituted (meth)acrylamide, which contains a keto group in the N-substituent, with aminoguanidine or a salt thereof and then polymerizing the resulting monomeric guanyl hydrazone derivative formed or copolymerizing the said monomeric guanyl hydrazone derivative with one or more other copolymerizable monomers.

5. Method according to claim 4, wherein the said polymerization or copolymerization occurs in the reaction medium of the aminoguanidine or salt thereof with the monomeric N-alkyl substituted (meth)acrylamide, which contains a keto group in the N-substituent.

* * * * *